United States Patent
Martens et al.

(10) Patent No.: US 12,160,162 B2
(45) Date of Patent: Dec. 3, 2024

(54) COOLING ELEMENT FOR AN ELECTRIC MOTOR, ELECTRIC MOTOR AND METHOD FOR COOLING THE MOTOR

(71) Applicant: ZIEHL-ABEGG AUTOMOTIVE GMBH & CO. KG, Kupferzell (DE)

(72) Inventors: Sebastian Martens, Stuttgart (DE); Natale Cosmo Bifano, Frankfurt (DE); Sascha Klett, Oppenweiler (DE); Maximilian Munz, Schwäbisch Hall-Hessental (DE)

(73) Assignee: ZIEHL-ABEGG AUTOMOTIVE GMBH & CO. KG, Kupferzell (DE)

( * ) Notice: Subject to any disclaimer, the term of this patent is extended or adjusted under 35 U.S.C. 154(b) by 617 days.

(21) Appl. No.: 17/277,513

(22) PCT Filed: Jul. 15, 2019

(86) PCT No.: PCT/DE2019/200079
§ 371 (c)(1),
(2) Date: Mar. 18, 2021

(87) PCT Pub. No.: WO2020/057699
PCT Pub. Date: Mar. 26, 2020

(65) Prior Publication Data
US 2022/0029509 A1 Jan. 27, 2022

(30) Foreign Application Priority Data

Sep. 18, 2018 (DE) ...................... 10 2018 215 868.1
Dec. 20, 2018 (DE) ...................... 10 2018 222 625.3

(51) Int. Cl.
*H02K 9/22* (2006.01)
*B60K 1/00* (2006.01)
(Continued)

(52) U.S. Cl.
CPC .............. *H02K 9/227* (2021.01); *B60K 1/00* (2013.01); *B60K 11/04* (2013.01); *H02K 5/203* (2021.01); *B60K 2001/006* (2013.01)

(58) Field of Classification Search
CPC .. H02K 5/20; H02K 5/02; H02K 5/04; H02K 5/08; H02K 9/16; H02K 9/19; H02K 9/18;
(Continued)

(56) References Cited

U.S. PATENT DOCUMENTS 5,856,716 A 1/1999 Coupart
6,633,097 B2 * 10/2003 Dunlap .................. H02K 5/203
310/58
(Continued)

FOREIGN PATENT DOCUMENTS

CN 101645632 A 2/2010
CN 102055281 5/2011
(Continued)

*Primary Examiner* — Bryan R Perez
(74) *Attorney, Agent, or Firm* — FisherBroyles, LLP; Jason P. Mueller

(57) ABSTRACT

Heat sink for an electric motor, in particular for a wheel hub drive of a commercial vehicle, with a channel which connects a first connection of the heat sink and a second connection of the heat sink, wherein the channel winds around the heat sink in a spiral. With such a heat sink, a flow condition of coolant within the channel can be generated in which secondary vortices are formed, and the cooling capacity is significantly improved.

14 Claims, 3 Drawing Sheets

(51) Int. Cl.
*B60K 11/04* (2006.01)
*H02K 5/20* (2006.01)

(58) Field of Classification Search
CPC ............ H02K 9/197; H02K 9/20; H02K 9/06; H02K 9/14; H02K 41/031; H02K 1/193; H02K 1/32; H02K 1/20
See application file for complete search history.

(56) References Cited

U.S. PATENT DOCUMENTS

| | | | |
|---|---|---|---|
| 2005/0151431 A1 | 7/2005 | Cronin | |
| 2008/0278011 A1 | 11/2008 | Elgas | |
| 2014/0077634 A1* | 3/2014 | Fischer | F28F 13/08 310/54 |
| 2018/0019638 A1* | 1/2018 | Ben-Omrane | H02K 5/207 |
| 2019/0099764 A1* | 4/2019 | Enis | B04B 5/08 |
| 2019/0312488 A1* | 10/2019 | Latulipe | H02K 5/04 |
| 2020/0324640 A1* | 10/2020 | Munz | B60B 27/0052 |

FOREIGN PATENT DOCUMENTS

| | | |
|---|---|---|
| CN | 103917393 A | 7/2014 |
| CN | 106849509 A | 6/2017 |
| CN | 106992614 | 7/2017 |
| CN | 207368779 | 5/2018 |
| CN | 108462318 | 8/2018 |
| DE | 69703128 T2 | 5/2001 |
| DE | 102005058031 A1 | 6/2007 |
| DE | 102008030524 A1 | 1/2009 |
| DE | 102008004083 A1 | 7/2009 |
| DE | 202010005834 U1 | 11/2010 |
| DE | 102010007636 A1 | 8/2011 |
| DE | 102011076529 A1 | 11/2012 |
| DE | 102011081507 A1 | 2/2013 |
| DE | 102015205141 A1 | 9/2016 |
| DE | 102015224186 A1 | 6/2017 |
| DE | 102016217361 A1 | 3/2018 |
| JP | 2011010525 A | 1/2011 |
| JP | 2012023837 | 2/2012 |
| JP | 2013169048 A | 8/2013 |
| JP | 2017135932 A | 8/2017 |
| WO | WO-2018024295 A1 * | 2/2018 ......... B60B 27/0015 |

* cited by examiner

COOLING ELEMENT FOR AN ELECTRIC MOTOR, ELECTRIC MOTOR AND METHOD FOR COOLING THE MOTOR

RELATED APPLICATIONS

This application is a national stage entry under 35 U.S.C. 371 of PCT/DE2019/200079, filed Jul. 15, 2019, which in turn claims priority to German Patent Application No. 10 2018 215 868.1, filed Sep. 18, 2018, and German Patent Application No. 10 2018 222 625.3, filed Dec. 20, 2018, the disclosures of which are incorporated herein by reference.

BRIEF DESCRIPTION

Embodiments of the present disclosure relate to a cooling element, namely a heat sink for an electric motor, in particular for a wheel hub drive of a commercial vehicle, with a channel which extends between a first connection of the heat sink and a second connection of the heat sink. Embodiments of the present disclosure also relate to an electric motor with a corresponding heat sink and a method for cooling the electric motor.

BACKGROUND

Heat sinks have been known from practice for years. Particularly in the field of wheel hub drives, liquid cooling systems for electric motors are widespread in order to provide adequate heat dissipation at a high power density. In spite of the high efficiency over large areas of the characteristic field, electric motors designed as wheel hub drives have operating states in which a large part of the power is converted into heat, for example in starting situations with an incline.

These peak loads, at which high heat fluxes emanate from the coils, can be absorbed and defused by using comparatively large components with a high mass and high thermal capacity. This can be, for example, ribs of the coil windings, which are made of stainless steel and can briefly absorb a relatively high amount of thermal energy, which is then continuously dissipated during operation.

The heat exchangers used are heat sinks, which are generally cylindrical components and are placed into the interior of a stator core of the wheel hub drive.

According to a known embodiment, the heat sink is, for example, a cylinder made of aluminum into which channels are milled. The channel system is supplied with coolant from a coolant circuit on one side of the circumference of the cylinder. At the first connection, the coolant impacts a distributor channel perpendicularly as an impingement jet and is introduced from the distributor channel into a plurality of channels on the cylinder casing which extend parallel to one another. On the opposite side of the circumference of the cylinder, the coolant is collected at the second connection and from there returned to a coolant circuit.

This solution results in a pressure distribution that is very uneven along the running length of the distribution channel. Since the differential pressure across the channel system drives the volume flow, an uneven pressure distribution in the distribution channel causes a corresponding uneven pressure distribution in the individual channels. The two outer channels, which are located directly in the impact area of the impingement jet, have a stronger flow than the remaining channels. This causes an inhomogeneity of the volume flows through the individual channels and thus also an inhomogeneous temperature distribution between the individual channels and different amounts of heat that each individual channel can dissipate. This creates so-called hotspots, i.e. areas that get particularly hot during operation and from which heat is particularly poorly dissipated. The occurrence of these hotspots can damage components.

With the known heat sinks arranged inside the stator core of a wheel hub drive, cooling capacities of approximately 14 kW to 16 kW can be achieved. In the design and modeling of such heat sinks according to the prior art, any curvature of the channels is usually ignored, and the channels are assumed to be straight lines.

SUMMARY

The present disclosure is therefore based on the object of designing and developing a cooling system of the type mentioned at the beginning in such a way that a higher degree of efficiency can be achieved, and the periods in which individual areas are exposed to high temperatures are reduced.

The object is achieved according to the present disclosure by the features of the claims whereby the channel in question wraps around the heat sink in a spiral.

With regard to the electric motor, the above object is achieved by the features of the claims, according to which the electric motor is equipped with a corresponding heat sink. With regard to the method according to the invention, the object is achieved by the features of the claims, according to which coolant is guided within the channel at a flow rate that is sufficiently high to cause the Dean number in the channel is greater than or equal to 50, and preferably greater than 54, at least in sections.

In the manner according to the present disclosure, it was first recognized that by taking into account the curvature of the channels as a function of the other dimensions of the channels, the flow behavior of the coolant within the channels can be specifically influenced and optimized.

Due to centrifugal forces, when the dimensionless Dean number is increased, secondary vortices occur, as can be observed, for example, with elbows in pipelines. Although the Dean number depends, on the one hand, on the flow rate and the viscosity of the coolant, it can also be influenced by changing a curvature and changing the width and height of the channels—or the hydraulic diameter of the channels.

Depending on the geometry of the channels, several double vortices can occur distributed over the cross-section of the channel. On the one hand, this turbulence causes an increase in the pressure loss when flowing through the channel due to additional friction on the channel wall. On the other hand, a more uniform pressure distribution and an improved mixing of the flow are achieved. The mixing increases the heat transfer, because the Nusselt number—which describes the heat transfer to the coolant—is strongly dependent on the Dean number in a curved channel, even in laminar flow conditions. This increases the amount of heat that can be dissipated from the electric motor to the coolant via the heat sink, i.e. the cooling capacity. In addition, the temperature distribution is more homogeneous than with cooling according to the prior art. The formation of hotspots is reduced. With comparable dimensions, cooling capacities of about 26 kW can be achieved with the heat sink according to the teaching described herein, which is a considerable improvement compared to the 14 kW to 16 kW that can be achieved with heat sinks according to the prior art.

Since the flow does not flow through several parallel channels, but only one spiral-shaped channel, the channel length and the flow rate increase. Both increase the pressure loss. The Dean number of the flow through the channels of the proposed heat sink is significantly higher in comparison to the known heat sinks. In return, a uniform—albeit swirled—flow through the spiral-shaped channel is guaranteed at every operating point. Even though the pressure loss over the ducting is increased compared to the parallel ducting, the pressure loss for a given volume flow still appears to be relatively low and therefore negligible.

The heat sink is preferably designed in the form of a rotational body. This can be, for example, a truncated cone which has a first surface area, a second surface area, and a casing, the casing of the rotational body preferably being provided with a groove forming the channel. Since the channel winds around the heat sink in a spiral shape, the heat sink—with the channel—is strictly speaking not completely rotationally symmetrical.

According to an embodiment, the heat sink is designed as a hollow circular cylinder. The circular cylindrical shape of the heat sink is suitable for use with electric motors that have a stator and a rotor that can be rotated relative thereto. The stator and rotor are also regularly designed in the form of a first circular cylinder and a hollow second circular cylinder surrounding it. In this case, either the outer, hollow second circular cylinder is the non-rotatable stator and the inner first circular cylinder is the rotor that rotates relative to it (internal rotor), or the inner, first circular cylinder is the non-rotatable stator and the hollow, second circular cylinder is the rotor that rotates relative to it (external rotor). While the heat sink according to the teaching described herein can be arranged externally around the stator of the internal rotor motor in the first case, the heat sink is inserted inside the stator of an external rotor motor in preferred embodiments. The latter embodiment is particularly suitable for the wheel hub drives of vehicles—preferably commercial vehicles. Due to its hollow circular cylindrical shape, the heat sink is adapted to the shape of the likewise circular cylindrical stator.

The groove forming the channel can be made wholly or partially in an outer surface of the casing of the rotational body forming the heat sink, for example by milling. Preferably, however, the channel is at least partially introduced into an inner surface of the casing of the heat sink. The heat sink is therefore suitable for use in a permanent-magnet synchronous motor (PMSM) designed as an external rotor motor and can be inserted inside the stator core.

According to one embodiment, the first connection and the second connection can be located closer to the first surface area of the heat sink. The first connection can, in particular, serve to supply coolant, while the second connection returns the coolant to the coolant circuit. The coolant can thus be introduced close to the first surface area and move along the heat sink through the spiral channel.

Preferably, the channel can make a U-turn closer to the second surface area of the heat sink. The guide of the channel in particular has an angle of almost 180°. The area of the U-turn can have a particularly high curvature compared to the rest of the spiral guide of the channel and lead to a particularly high Dean number, which in turn favors the creation of secondary vortices and increases the heat absorption of the coolant in the heat sink and thus the cooling capacity.

After the U-turn, the channel then moves back towards the first surface area to end in the second connection. The first connection and the second connection are preferably circumferentially opposite one another. This configuration is particularly advantageous for the use of the heat sink with wheel hub drives, because the coolant can be supplied to the heat sink on the inside of the vehicle wheel—close to the first surface area—and can also be returned to the coolant circuit on the same side.

According to a further embodiment, the channel is designed in the form of a double helix in areas. In particular, the first connection can be connected to a first strand of the double helix, and the second connection can be connected to a second strand of the double helix. Thus, the first strand of the double helix leads from the first connection to the U-turn. The second strand of the double helix leads from the U-turn to the second connection. Due to the double helix shape, windings of the first strand, which lead the coolant to the U-turn in one direction, alternate with windings of the second strand, which lead the coolant in the opposite direction.

The coolant supplied to the heat sink—which has the lowest temperature when it enters the first connection—accordingly first passes through the windings of the first strand and absorbs heat in the process. There is a temperature difference not only with respect to the components to be cooled, but also with respect to the coolant in the windings of the second strand. Because after the U-turn, the coolant flows back through the windings of the second strand, but in opposite directions between two windings of the first strand, until it has reached the highest temperature when it exits the second connection.

While the temperatures in the windings of the first strand and the second strand near the first surface area are far apart, the temperatures in the windings of the first strand and the second strand in the U-turn near the second surface area are largely equal. Since the particularly cold coolant in the windings of the first strand near the first surface area has a high temperature difference compared to the components to be cooled, and the already largely heated coolant in the windings of the second strand near the first surface area has a low temperature difference compared to the components to be cooled, the cooling capacity can be adapted to a fairly uniform extent over the axial extension of the heat sink.

More preferably, a width of the channel is greater than a third of a height of the channel. Further preferably, the width of the channel is less than three times the height of the channel. The width of the channel can be approximately 5 to approximately 50 mm and in particular 7 mm to 21 mm. The height of the channel can also be approximately 5 mm to approximately 50 mm and in particular 7 mm to 21 mm. The ratio of width to height is preferably between ⅓ and 3, because in these areas the relative pressure loss can be represented universally as a function of the Dean number and thus manipulated in a targeted manner. With a more extreme ratio of width to height, the effect of increasing the relative pressure loss is reduced, since the vortex systems become unstable, and the radial flow exchange no longer takes place mainly on the outer walls. The radius of curvature of the channels—that is, the radius of the casing of the rotational body—can preferably be between 50 mm and 200 mm.

According to an embodiment, the heat sink is made of aluminum, it being possible to use any material with a suitable thermal conductivity and a suitable specific thermal capacity.

According to the teaching described herein, an electric motor is also proposed which includes such a heat sink—with one or more of the features described. Preferably it is a permanent-magnet synchronous motor (PMSM) designed as an external rotor motor. More preferably, the electric motor is a wheel hub drive for a vehicle, in particular for a commercial vehicle.

In this case, the heat sink can be located inside a stator of the electric motor and dissipate the energy that is converted into heat during operation.

According to the teaching described herein, a method for cooling an electric motor is finally proposed. In this case, coolant is guided at a flow rate in a channel or in the channel of the heat sink described. The flow rate is high enough to cause a Dean number greater than or equal to 50 in at least some sections of the channel. Preferably, the Dean number is greater than 54 so that secondary vortices form in the flow of coolant through the channel. A heat sink according to the teaching described herein is preferably used. The coolant is introduced into the spiral channel at the first connection, which winds around the heat sink. Depending on the dimensions of the channel or channels of the heat sink and the viscosity of the coolant, the Dean number can be determined via the flow rate and the formation of secondary vortices can be controlled.

There are various options for advantageously designing and refining the teaching of the present invention. For this purpose, reference is made, on the one hand, to the claims subordinate to claim 1 and, on the other hand, to the following explanation of preferred exemplary embodiments of the invention with reference to the drawing. In connection with the explanation of the preferred exemplary embodiments of the invention with reference to the drawing, generally preferred designs and refinements of the teaching are also explained. The figures show the following

DETAILED DESCRIPTION

Figure 1A:
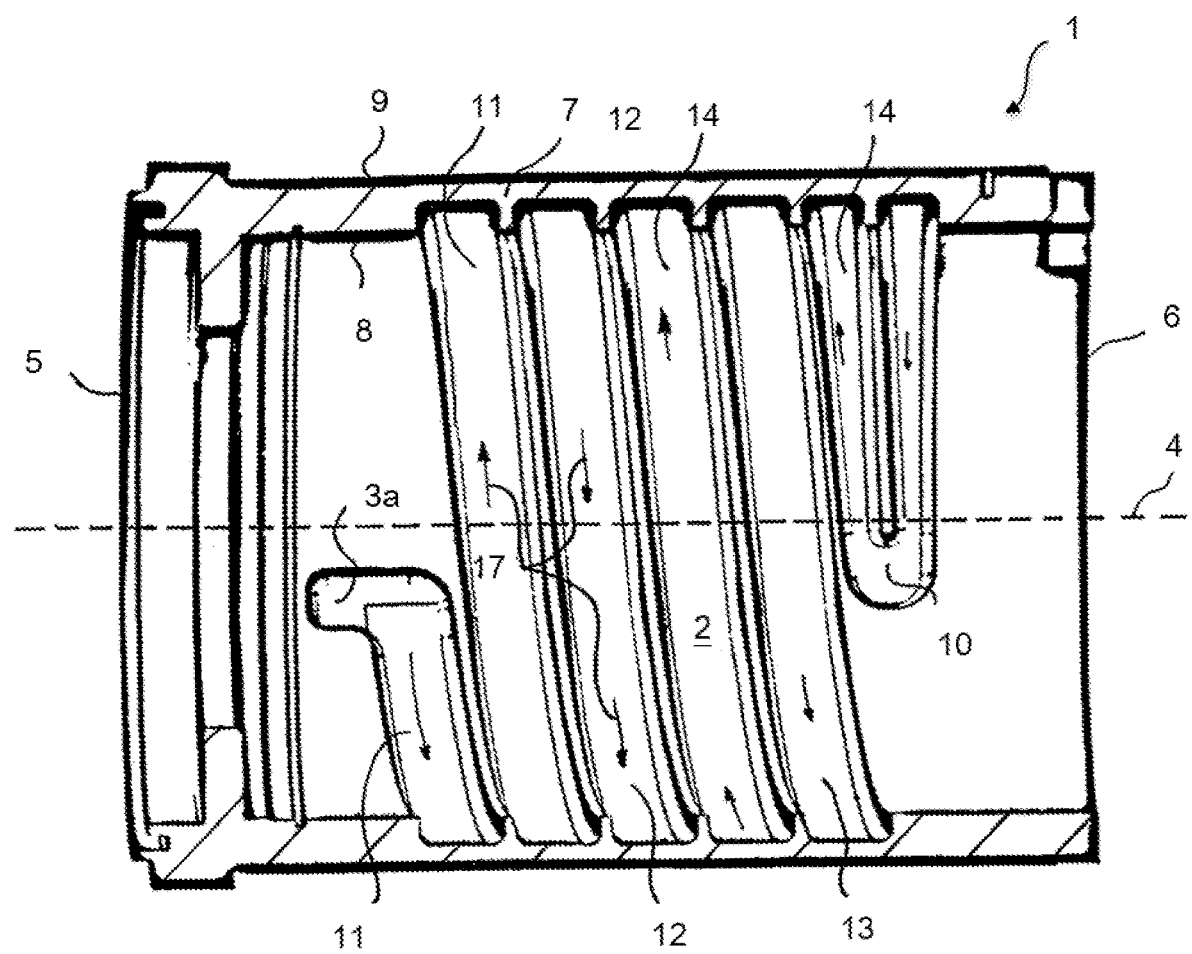
FIG. 1a an embodiment of a heat sink in a longitudinal section.

A heat sink 1 for an electric motor (not shown) can generally be seen in FIG. 1a. The heat sink 1 is particularly suitable for cooling permanent-magnet synchronous motors (PMSM) which are designed as external rotor motors, preferably as a wheel hub drive for a vehicle and in particular for a commercial vehicle. In these embodiments, the heat sink 1 is arranged in the interior of a stator or a stator core of the electric motor.

The heat sink 1 includes a channel 2 which extends between a first connection 3a of the heat sink 1 and a second connection (not shown in FIG. 1a) of the heat sink 1. Since FIG. 1a is a sectional view, only the first connection 3a can be seen. In this embodiment, the second connection, however, is formed to be rotationally symmetrical about the longitudinal axis 4 as relates to the first connection 3a. The first connection 3a and the second connection are thus circumferentially opposite one another.

The heat sink 1 is designed in the form of a hollow circular cylinder. The hollow circular cylinder has a first surface area 5, a second surface area 6, and a casing 7. The casing 7 of the circular cylinder is provided with a groove that forms the channel 2. The channel 2 wraps around the heat sink 1 in a spiral. In the embodiment shown, the channel 2 is designed in the form of a double helix and is introduced into an inner surface 8 of the casing 7. In other embodiments, the channel 2 can, however, also be introduced into an outer surface 9 of the casing 7. The first connection 3a and the second connection are closer to the first surface area 5 of the heat sink 1 than to the second surface area 6 of the heat sink 1. On the opposite side, closer to the second surface area 6 of the heat sink 1, the channel 2 makes a U-turn 10, the channel 2 changing its direction in a tight curve by approximately 180°.

The first connection 3a is connected to a first strand 11 of the double helix. During operation, the first strand 11 guides coolant from the first connection 3a to the U-turn 10, via the windings 12, 13 of the first strand 11. A second strand 14 guides the coolant back from the U-turn 10, via the windings 15, 16 of the first strand 11, to the second connection 3b, in the direction of the first surface area 5 of the heat sink 1. From there, the coolant can return to a coolant circuit (not shown). The direction of flow of the coolant within the first strand 11 and the second strand 12 of the channel 2 can be traced using the arrows 17.

Figure 1B:
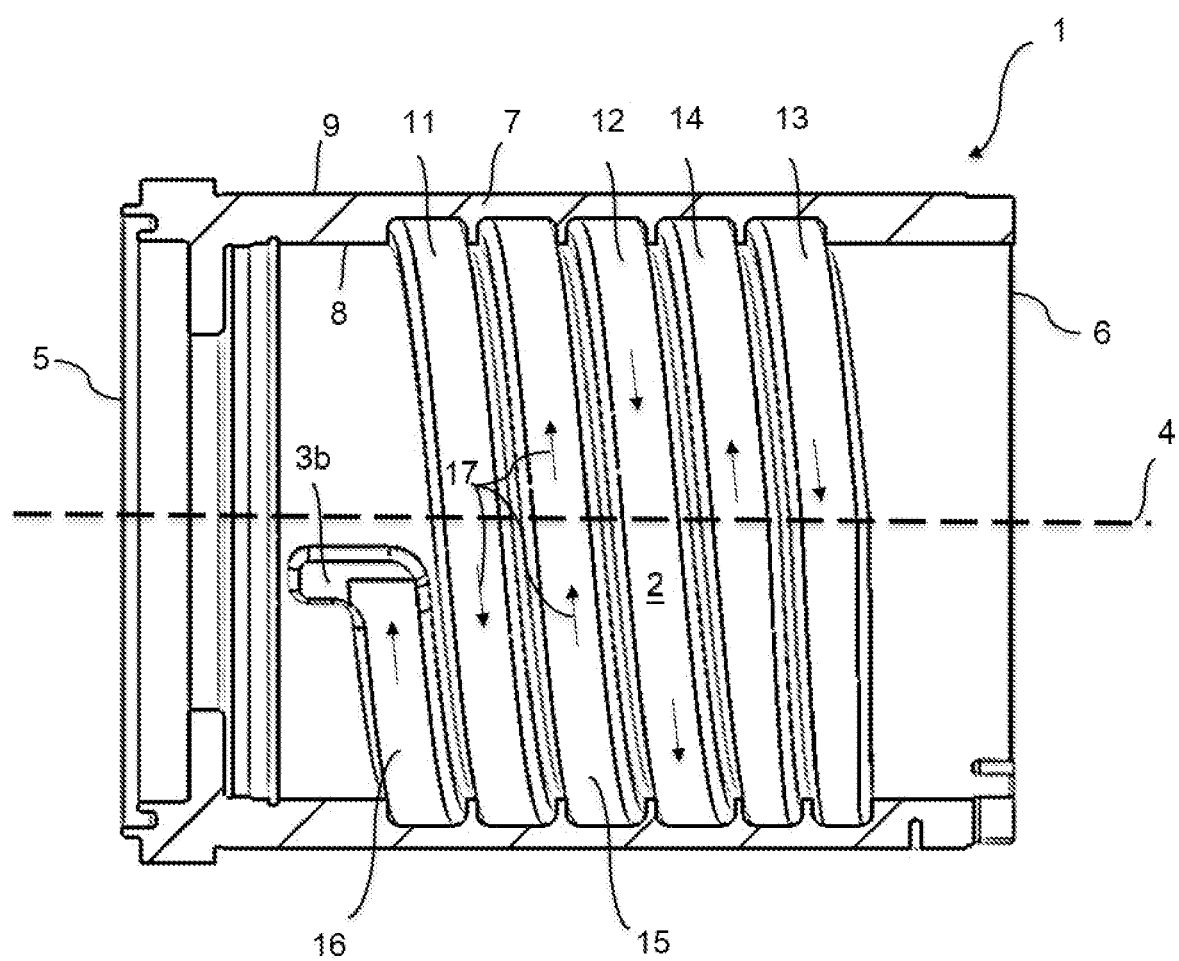
FIG. 1b the embodiment of the heat sink in a longitudinal section, from the opposite side view.

FIG. 1b shows the embodiment of the heat sink 1 from FIG. 1a also in a longitudinal section, but from the opposite side, so that in FIG. 1b the particular part of the heat sink 1 is shown that is not shown in FIG. 1a due to the section, and vice versa.

The direction of flow of the coolant can also be traced in FIG. 1b using the arrows 17. The coolant, which flows from the first connection 3a (not shown in FIG. 1b) to the U-turn (not shown in FIG. 1b), via the windings 12, 13 of the first strand 11, during operation, reaches the second connection 3b after the U-turn, via the strand 14 of the channel 2, through its windings 15, 16, and from there returns to the coolant circuit.

Figure 2:
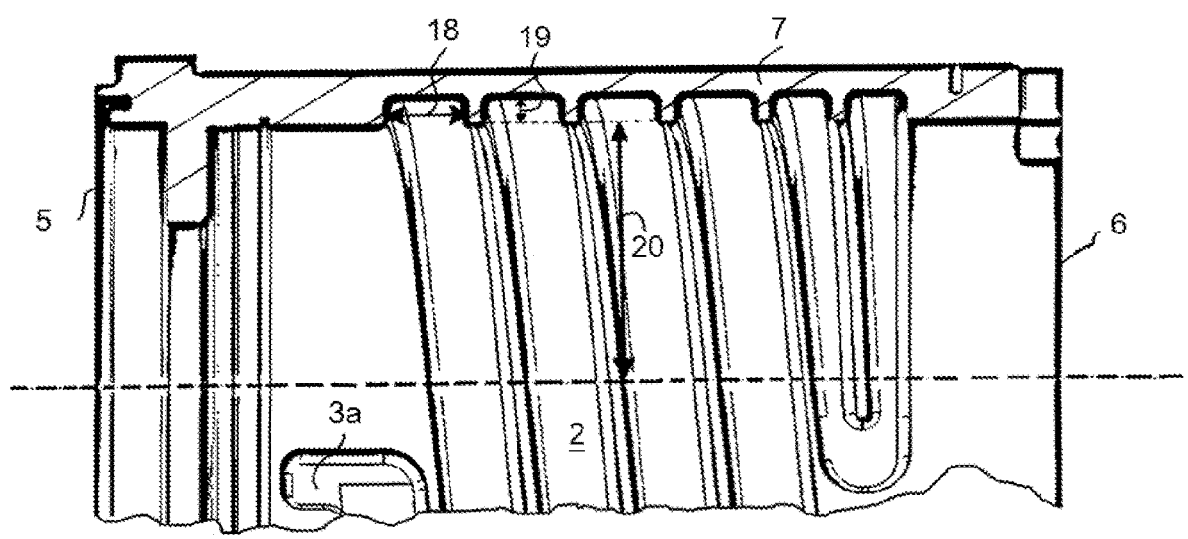
FIG. 2 the embodiment of the heat sink in an enlarged section.

The geometry of the heat sink 1 and in particular of the channel 2 can be seen in FIG. 2.

A width 18 of the channel 2 is approximately three times the size of the height 19 of the channel 2. The width 18 may be approximately 40 mm, while the while the height 19 is about 13.5 mm. The radius of curvature 20 is approximately 140 mm. With these given dimensions, the Dean number is only dependent on the flow rate and viscosity at which the coolant flows through channel 2.

The Dean number is generally described by the equation $$De = \frac{u}{v}\sqrt{\frac{d_h^3}{2r_k}}$$

with the flow rate u, the viscosity v, the radius of curvature $r_k$ 19 and the hydraulic diameter of the channel $d_h$. While the hydraulic diameter can be determined from the width 18 and the height 19 for a rectangular cross-section, the radius of curvature $r_k$ 20 is measured from the longitudinal axis 4 of the heat sink 1 to the inner surface 8 of the casing 7, that is to say to the inner boundary surface of the channel 2.

Given such a predetermined geometry of the channel 2, the Dean number depends De only on the flow rate u, and the viscosity v. Thus, with the execution of a method for cooling an electric motor with a heat sink 1 according to the exemplary embodiment in FIGS. 1 and 2, only a coolant with a suitable viscosity v and suitable flow rate u must be guided through channel 2 in order to reach a certain Dean number. In order for secondary vortices to form at least in sections, a Dean number greater than 54 should be achieved.

With regard to further advantageous embodiments of the device according to the invention, reference is made to the general part of the description and to the appended claims to avoid repetition.

Finally, it is to be expressly noted that the above-described exemplary embodiments are used solely to explain the claimed teaching, but do not restrict it to the exemplary embodiments.

LIST OF REFERENCE NUMERALS

1 Heat sink
2 Channel
3a First connection
3b Second connection
4 Longitudinal axis
5 First surface area
6 Second surface area
7 Casing
8 Inner surface
9 Outer surface
10 U-turn
11 First strand
12 Winding
13 Winding
14 Second strand
15 Winding
16 Winding
17 Arrow
18 Width
19 Height
20 Radius of curvature

The invention claimed is:

1. A heat sink for an electric motor designed as a wheel hub drive, comprising:
   a channel extending between a first connection of the heat sink and a second connection of the heat sink, wherein the channel wraps around the heat sink in a double helix;
   wherein a cross section of the channel is rectangular, and a relative pressure loss can be manipulated in a targeted manner due to the channel having a width which is greater than one third of a height of the channel and is less than three times the height of the channel
   wherein the first connection and the second connection are arranged on opposite sides of the circumference of the heat sink, circumferentially opposite one another, and the first connection and the second connection enter and exit through a cylindrical sidewall surface of the heat sink.

2. The heat sink of claim 1, wherein the heat sink comprises a rotational body having a first area surface, a second area surface, a casing, and a groove in the casing forming the channel.

3. The heat sink of claim 2, wherein the rotational body comprises a hollow cylinder.

4. The heat sink of claim 2, wherein the channel is at least partially formed in an inner surface of the casing.

5. The heat sink of claim 2, wherein the first connection and the second connection are located closer to the first surface area than to the second surface area.

6. The heat sink of claim 5, wherein the channel comprises a U-turn at a location closer to the second surface area than to the first surface area.

7. The heat sink of claim 1, wherein the first connection is connected to a first strand of the double helix, and the second connection is connected to a second strand of the double helix.

8. The heat sink of claim 1, wherein the heat sink is made of aluminum.

9. An electric motor designed as a wheel hub drive, comprising: a heat sink, the electric motor having a channel extending between a first connection of the heat sink and a second connection of the heat sink, wherein the channel comprises a double helix that wraps around the heat sink, wherein a cross section of the channel is rectangular, and a relative pressure loss can be manipulated in a targeted manner due to the channel having a width which is greater than one third of a height of the channel and is less than three times the height of the channel, and wherein the first connection and the second connection are arranged on opposite sides of the circumference of the heat sink, circumferentially opposite one another, and the first connection and the second connection enter and exit through a cylindrical sidewall surface of the heat sink.

10. The electric motor of claim 9, wherein the electric motor comprises a permanent-magnet synchronous motor (PMSM) designed as an external rotor motor.

11. The electric motor of claim 9, wherein the electric motor is a wheel hub drive for a vehicle.

12. The electric motor of claim 9, further comprising a stator, wherein the heat sink is located inside the stator.

13. A method for cooling an electric motor designed as a wheel hub drive with a heat sink having a rectangular double helix channel extending between a first connection of the heat sink and a second connection of the heat sink, comprising the steps of:
   guiding coolant through first and second strands of the rectangular double helix channel between the first connection and the second connection, the first and second connections being on opposite sides of the circumference of the heat sink, circumferentially opposite of one another, wherein the first connection and the second connection enter and exit through a cylindrical sidewall surface of the heat sink, and wherein the rectangular double helix channel has a width that is greater than one third of a height of the channel and less than three times the height of the channel;
   wherein guiding coolant within the channel is performed at a flow rate which is sufficiently high enough to yield a Dean number in the channel that is greater than or equal to 50, wherein the channel wraps around the heat sink in a double helix.

14. The method of claim 13, wherein the flow rate is sufficiently high to yield a Dean number greater than 54.

* * * * *